March 21, 1967  C. H. FOLMSBEE ETAL  3,310,197

SAFETY VENT

Filed May 17, 1965

INVENTORS.
CLYDE H. FOLMSBEE.
RALPH G. PORTIS.

BY Zabel, Baker, York,
Jones and Dithmar

ATTORNEYS.

United States Patent Office 3,310,197
Patented Mar. 21, 1967

3,310,197
SAFETY VENT
Clyde H. Folmsbee, Charlevoix, Mich., and Ralph G. Portis, Highland Park, Ill., assignors to Midland Manufacturing Corp., Skokie, Ill., a corporation of Illinois
Filed May 17, 1965, Ser. No. 456,132
5 Claims. (Cl. 220—89)

This invention relates to a safety vent for a pressure vessel, and more particularly to a safety vent having a pressure relief frangible member which readily may be inspected, and easily may be removed and replaced when necessary.

A safety vent of the general type contemplated by this invention is a safety relief device adapted to be secured around an opening in a pressure vessel such as that used on railway tank cars, tank trucks, tank barges and stationary tanks in refineries and storage areas. The relief device has an opening leading to atmosphere, and this opening is closed by a frangible member adapted to rupture at a predetermined pressure.

Safety vents are used whenever an increase of internal pressure in a vessel might create a hazard. A dangerous increase in pressure often occurs when an external fire or intense sunlight increases the temperature of the material contained within the vessel. Some materials generate heat as a consequence of chemical action within the material, resulting in a pressure increase. In addition, increased pressure within a vessel sometimes is introduced intentionally to facilitate unloading the vessel.

One object of the invention is to provide a safety vent having a hinged inspection cap that readily may be opened to permit inspection of the frangible member. The cap is retained detachably in closed position and is effective to maintain the frangible member and the internal parts of the vent in comparatively clean condition and free of damage from external influence.

Another object is to provide a safety vent wherein the frangible member easily may be removed and replaced when necessary. To this end, a retainer for clamping the frangible member in place is used, and held in clamping position by means of quick-acting securing means that preferably are non-separable from the vent. As is well known, safety vents frequently are positioned in comparatively inaccessible locations, and difficulties arise when fastening means such as nuts or bolts are dropped during inspection, or during the operation of removing and replacing a frangible member.

Still another object is to provide a safety vent wherein the frangible member is clamped in place between a base and a retainer that have non-rotatable relative motion toward and away from each other axially and laterally. This arrangement is superior to a base and retainer that screw together, wherein the frangible member is subject to damage as a result of torque action, and the screw threads are subject to malfunction as a result of rust and corrosion.

Other objects, advantages and details of the invention will be apparent as the description proceeds, reference being had to the accompanying drawing wherein one form of the invention is shown. It will be understood that the description and drawing are illustrative only, and that the scope of the invention is to be measured by the appended claims.

Figure 1:
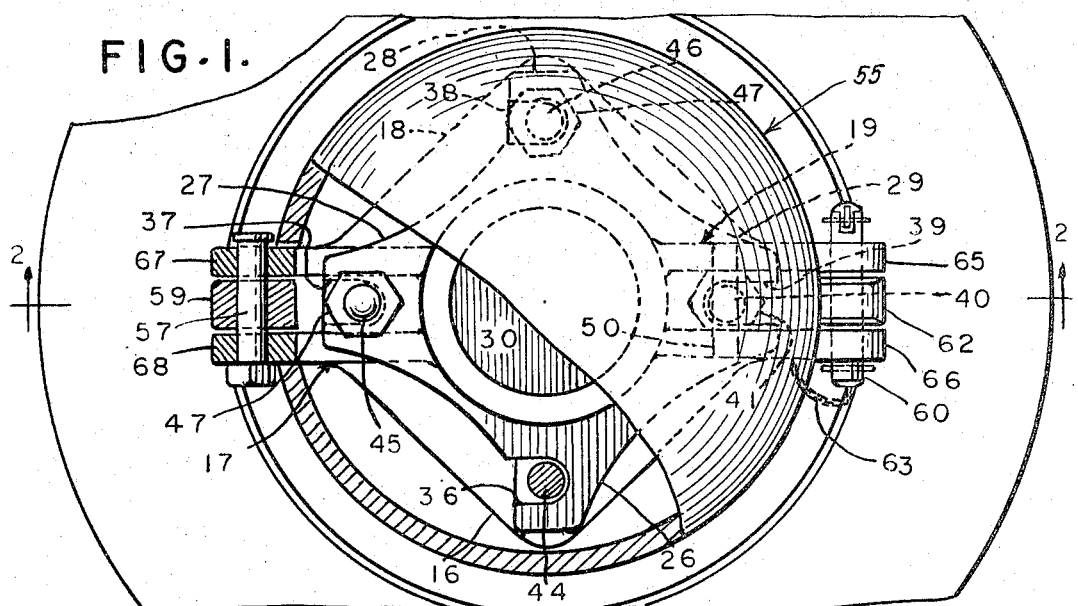
FIG. 1 is a top plan view, partly broken away and partly in section, of a safety vent embodying the invention.
Figure 2:
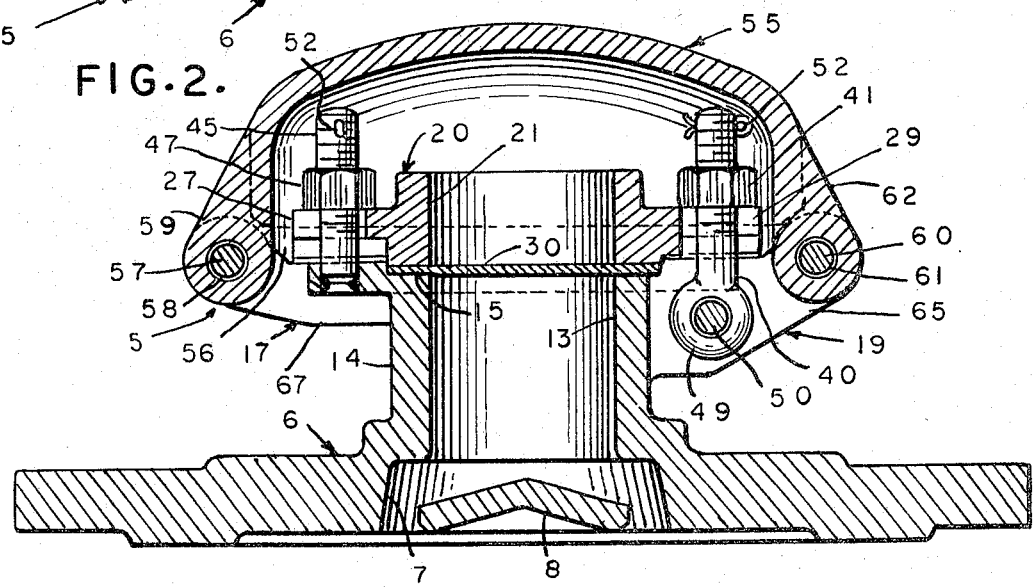
FIG. 2 is a sectional view on line 2—2 of FIG. 1.

Referring to FIGS. 1 and 2 of the drawing, the illustrated safety vent 5 includes a base 6 adapted to be secured around an opening in a pressure vessel (not shown). Base 6 has a central opening 7 that optionally may be closed partially by a protective baffle 8.

Figure 3:
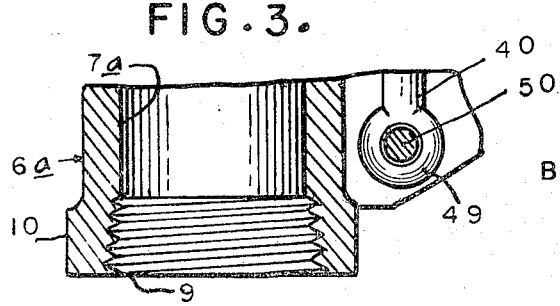
FIG. 3 is a fragmentary sectional view showing a modification in the structure employed for mounting the safety vent on a pressure vessel.

The modification shown in FIG. 3 contemplates a base 6a having an opening 7a provided with tapering internal threads 9. Periphery 10 of base 6a may be hexagonal for ease in applying the base to a threaded standpipe (not shown) leading from the opening in an associated pressure vessel. The other parts of the FIG. 3 safety vent are the same as those in the vent shown in FIGS. 1 and 2, and these parts next will be described.

Opening 7 or 7a in base 6 or 6a continues upwardly as shown at 13. Portion 14 of the base surrounding upward opening 13 terminates in a seat 15.

Base 6 or 6a includes spaced mounting portions 16, 17, 18 and 19 (FIG. 1). As shown, these four mounting portions are in quadrature relation, but it will be understood that more or less portions may be used, and the precise spacing is optional. The mounting portions shown have been found particularly suitable in the illustrated form of the invention.

A retainer 20 having a central opening 21 is adapted to mount on base 6 or 6a with opening 21 in alignment with opening 13 in base 6 or 6a. Retainer 20 has spaced parts 26, 27, 28 and 29 in general alignment with the spaced mounting portions 16, 17, 18 and 19 of base 6 or 6a.

A replaceable frangible member 30, usually a disc, rests on seat 15 of base 6 or 6a, and is clamped in place by retainer 20. Member 30 is of such thickness and material, for example, lead, that it will rupture in response to pressure in predetermined amount, and is well known in the art.

The invention contemplates the use of quick-acting securing means for connecting spaced mounting portions 16, 17, 18 and 19 of base 6 or 6a and spaced parts 26, 27, 28 and 29 of retainer 20. In more detailed aspect, the invention contemplates that the securing means will have non-detachable relation with the safety vent. Thus, for example, over-center or toggle type securing means connected to the base or retainer may be used to secure the two parts together in clamped relation and to facilitate disassembly.

In the form of the invention shown, the quick-acting securing means comprise a pivoted eye bolt and associated nut, and threaded studs and associated nuts, the several nuts retained more or less permanently in position by means of cotter pins extending through the bolt and studs. This detailed aspect of the invention next will be described.

Referring first to retainer 20, spaced parts 26, 27, 28 and 29 of the retainer are provided with openings 36, 37, 38 and 39. These openings, in the form of the invention shown, are laterally opening recesses. All but one of the laterally opening recesses, namely, recesses 36, 37 and 38, enter the spaced parts of retainer 20 from the same direction, namely, from the left of FIG. 1, and recess 39 in the other spaced part 29 enters from another direction. As shown, recess 39 enters from the direction opposite to that of the other recesses, namely, from the right in FIG. 1.

The illustrated quick-acting securing means, as mentioned, include a pivoted eye bolt 40, best shown in FIG. 2, an associated nut 41, and threaded studs 44, 45 and 46 with a nut 47 on each stud. Studs 44, 45 and 46, respectively, are secured as by welding to mounting portions 16, 17 and 18, and, when retainer 20 is in place, extend through recesses 36, 37 and 38 of retainer mounting portions 26, 27 and 28.

Eye bolt 40 has its head 49 (FIG. 2) pivoted in a pin 50 carried by mounting portion 19. The axis of pin 50 is transverse to the entering direction of recess 39 in retainer mounting portion 29 so that bolt 40 may pivot into and out of recess 39 when nut 41 is loosened.

As will be seen, when nut 41 is loosened and bolt 40 pivoted away from its clamping position within recess 39, the nuts 47 on studs 44, 45 and 46 may be loosened slightly, and retainer 20 elevated and moved to the right and thence removed from its clamping position above frangible member 30. As will be understood, member 30 is removed and replaced by displacing retainer 20 in this manner.

Cotter pins 52 (FIG. 2) desirably are used at the ends of eye bolt 40 and studs 44, 45 and 46 to prevent separation and possible loss of the nuts.

An inspection cap 55 encloses retainer 20, frangible member 30 and the major portions of the securing means, except for an annular passageway 56 (FIG. 2) to atmosphere. Cap 55, as shown, is pivoted to base 6 or 6a by means of a pivot pin 57 carried on mounting portion 17, the pin 57 extending through an opening 58 in a finger 59 forming part of the cap.

Means are provided for detachably retaining cap 55 in closed position, and in the form of the invention shown, this means comprises a latching pin 60 removably carried by mounting portion 19 and extending through an opening 61 in a finger 62 integral with the cap. As shown in FIG. 1, pin 60 desirably is connected to mounting portion 19 by means of a flexible chain 63 to prevent inadvertent loss.

Describing the illustrated form of the invention in further detail, mounting portion 19, which is the mounting portion aligned with the spaced part 29 of retainer 20 having the recess 39 that enters from the right, includes a pair of spaced ears 65 and 66 (FIG. 1) having two pairs of aligned openings therein. Pin 50 for pivoted eye bolt 40 extends through one pair of aligned openings, while pin 60 for latching cap 55 in closed position extends through the other pair of aligned openings.

Similarly, opposed mounting portion 17 includes a pair of spaced ears 67 and 68 having aligned openings therein, the hinge pin 57 for cap 55 extending through the openings.

When it is desired to inspect the condition of frangible member 30, latching pin 60 readily is removed and cap 55 pivoted to open position. Because of the protection afforded by cap 55, member 30 usually is comparatively clean and subject to evaluation at a glance.

If frangible member 30 has been ruptured, nut 41 on pivoted eye bolt 40 is loosened to the extent necessary to swing bolt 40 out of recess 39, and the other nuts 47 are loosened slightly so that retainer 20 may be elevated and displaced laterally, thereby permitting easy removal and replacement of frangible member 30. Thereafter retainer 20 is returned to clamping position and the several nuts tightened, and cap 55 closed and latched.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A safety vent comprising:
    a base adapted to be secured around an opening in a pressure vessel, said base having a central opening and spaced mounting portions;
    a retainer having a central opening aligned with the central opening in said base and spaced parts aligned generally with said spaced mounting portions, said parts each having a laterally opening recess therein;
    a replaceable frangible member clamped between said base and said retainer and closing said central openings;
    quick-acting securing means on at least all but one of said spaced mounting portions entering said laterally opening recesses in said spaced parts of said retainer said quick-acting securing means including threaded members and nuts thereon;
    a cap over said retainer, said cap pivoted to said base for opening and closing action; and
    means detachably retaining said cap in closed position, whereby said cap readily is opened for inspection of said frangible member, and a ruptured frangible member easily is removed and replaced by loosening said nuts of said quick-acting securing means and displacing said retainer.

2. The safety vent of claim 1 wherein the recesses in all but one of the spaced parts of said retainer enter from the same direction and the recess in the other spaced part enters from another direction, whereby removal of the securing means from said other spaced part enables said retainer to be displaced laterally.

3. The safety vent of claim 2 wherein the securing means for said other spaced part comprises a bolt pivoted to said base, whereby said bolt pivots between securing and non-securing positions.

4. The safety vent of clam 3 wherein the entering direction of the recess in said other spaced part is opposite the entering direction of the other recesses.

5. The safety vent of claim 3 wherein the securing means for said all but one spaced parts each comprises a threaded stud extending upwardly from the aligned mounting portion.

References Cited by the Examiner

UNITED STATES PATENTS

| 1,415,216 | 5/1922 | Bingay | 220—89 |
| 1,630,672 | 5/1927 | Sage | 220—44 |
| 2,014,861 | 9/1935 | Neely | 220—44 |
| 2,393,078 | 1/1946 | Wager | 220—88 |

THERON E. CONDON, *Primary Examiner.*

RAPHAEL H. SCHWARTZ, *Examiner.*